United States Patent [19]
Jackson

[11] 3,798,045
[45] Mar. 19, 1974

[54] SILICA ENCAPSULATED LEAD CHROMATE PIGMENT OF THE PRIMROSE YELLOW SHADE

[75] Inventor: Julius Jackson, Westfield, N.J.

[73] Assignee: E. I. du Pont de Nemours and Company, Wilmington, Del.

[22] Filed: Sept. 27, 1972

[21] Appl. No.: 292,502

Related U.S. Application Data

[63] Continuation-in-part of Ser. No. 206,125, Dec. 8, 1971, abandoned.

[52] U.S. Cl. .............................. 106/298, 106/308 B
[51] Int. Cl. ............................................... C09c 1/20
[58] Field of Search ........................ 106/298, 308 B

[56] References Cited
UNITED STATES PATENTS

| | | | |
|---|---|---|---|
| 3,639,133 | 2/1972 | Linton | 106/298 |
| 3,370,971 | 2/1968 | Linton | 106/298 |
| 3,470,007 | 9/1969 | Linton | 106/298 |
| 2,808,339 | 10/1957 | Jackson | 106/298 |

Primary Examiner—Delbert E. Gantz
Assistant Examiner—J. V. Howard

[57] ABSTRACT

A primrose yellow shade pigment of outstanding light stability is prepared. The pigment comprises orthorhombic phase particles of a chemically prereduced lead chromate-lead sulfate solid solution, which particles are encapsulated with a dense amorphous silica coating.

1 Claim, No Drawings

SILICA ENCAPSULATED LEAD CHROMATE PIGMENT OF THE PRIMROSE YELLOW SHADE

CROSS-REFERENCE TO RELATED APPLICATION

This application is a continuation-in-part of application Ser. No. 206,125 filed Dec. 8, 1971 now abandoned.

BACKGROUND OF THE INVENTION

In Linton U.S. Pat. No. 3,370,971 there is described the manufacture of lead chromate pigments which have greatly improved resistance to discoloration upon contact with acids, alkalies, and soap solutions, and upon exposure to light and heat. These pigments are composed of lead chromate particles having deposited on their surfaces, as a substantially continuous coating, from about 2 to 40 percent by weight of dense, amorphous silica, optionally also, with alumina deposited on the silica. A typical process for the production of such pigments involves slurrying the lead chromate particles in an aqueous medium and depositing amorphous silica on them from an aqueous sodium silicate solution at a pH above 6 and a temperature above 60°C. Optionally, then, an aqueous solution of an aluminum-containing compound may be added to the resulting suspension of silica-coated lead chromate particles with continued heating above 60°C., whereby alumina is deposited on the silica coating. Such pigments are particularly advantageous in the plastics and paint industries.

The Linton patent exemplifies numerous species of lead chromate particles that may be used, these ranging from the greenish "primrose yellows," which are in the orthorhombic crystal form, to the redish "medium yellows," which are in monoclinic form, as well as to the "molybdate oranges" and "molybdate reds" which additionally contain lead molybdate. Although the temperature resistance of each of these species is improved to a very notable extent by the dense, amorphous silica coating, they are not always as satisfactory as would be desired from the standpoint of lightfastness, a property of particular importance in finishes, printing inks, and the like. This is particularly true when using the primrose shades of lead chromate pigment.

SUMMARY OF THE INVENTION

In accordance with the invention a means has been found for the provision of a primrose yellow shade silica-encapsulated lead chromate pigment that is characterized by outstanding light stability characteristics. In particular it has been found that the lightfastness of this species of pigment is remarkably enhanced by the use of a prereduced primrose shade lead chromate pigment as the base for the silica coating instead of the conventional primrose yellows.

DETAILED DESCRIPTION OF THE INVENTION

The primrose shade lead chromate (or chrome yellow) pigments are referred to in "Colour Index," 2nd edition, 1956, published jointly by the Society of Dyers and Colourists, England, and the American Association of Textile Chemists and Colorists, United States, under the designation Lead Sulfochromate CI-77603. They are represented by the general formula PbCrO$_4$ × PbSO$_4$ and usually contain 20 to 50 weight percent of PbSO$_4$ in solid solution, the crystal form of the particles being orthorhombic.

The term "prereduced" refers to the known chemical treatment of the primrose shade lead chromate base pigment to effect a reduction to a lower valence state of the CrO$_4^{-2}$ ions at the surface of the particles. Such prereduction must take place before coating the particles with amorphous silica. In any event the reduction may be accomplished in a number of ways, the most common of which is to admix the lead chromate in aqueous medium with metal ions readily convertible to a higher valence state. Antimony compounds, tin and manganese compounds may be used for this purpose, the use of the latter being illustrated in Jackson U.S. Pat. No. 2,808,339. In the case of antimony, for example, the reduction that would occur on the surface of the lead chromate base particles is as follows:

$$PbCrO_4 + Sb^{+3} + 2H^+ \rightarrow PbCrO_3 + Sb^{+5} + H_2O$$

Apart from the selection of the primrose shade, prereduced base lead chromate particles, other materials involved in the silica encapsulation process and the processing conditions to be employed therewith are described in the Linton patent, the disclosure of which is incorporated herein by reference.

Three methods of applying the silica coating are illustrated in the examples of the Linton patent, viz, (1) simultaneous but separate addition of a soluble silicate and a mineral acid, (2) addition of a silicic acid solution freshly prepared by deionizing a sodium silicate solution with a cation-exchange resin, and (3) addition of sodium silicate solution to the pigment slurry, followed by addition of sulfuric acid.

There are certain critical conditions which must be observed during the treatment by any of these three methods. To obtain the desired dense silica coatings on the deagglomerated pigment particles, the pH of the slurry at the point of addition of the silica-forming ingredients to the mixture must be at least above pH 6.0 and preferably in the range of 9.0 to 9.5. Furthermore, the temperature at this same point must be at least above 60°C. and preferably above 75°C. In many cases it is preferred that the temperature be about 90°C. When the pH is allowed to go below about 6.0 or the temperature significantly below 60°C., there is a pronounced tendency for the silica to precipitate in an undesired porous, gel-like structure.

The above-mentioned methods all result in the deposition of at least the major part of the silica as the desired amorphous continuous film on the surface of the pigment particles in the slurry. Advantageously the pigment particles will have first been deagglomerated by intense shear so as to give a fluid, easily stirrable starting slurry, e.g., as disclosed in Linton U.S. Pat. application Ser. No. 83,674 filed Oct. 23, 1970, now U.S. Pat. No. 3,639,133. A convenient starting slurry can contain approximately 25 percent pigment, the balance being water, but this concentration is not critical.

It is common for lead chromate pigments to be finished slightly on the acid side, and when such pigments are reconstituted to form the starting slurry an alkaline treatment is necessary to achieve the desired pH at the point of subsequent treatment. Such an alkaline treatment can employ any convenient alkali, such as ammonium hydroxide or sodium hydroxide, unless the use of a strong alkali such as sodium hydroxide is precluded by the sensitivity thereto of the lead chromate pigment to be coated. A still more convenient method is to add a small amount of a sodium silicate solution; this achieves the desired alkalinity and tends to improve the dispersion of the pigment particles in the slurry. In such a treatment, care should be exercised not to exceed a pH of about 12.0 lest the lead chromate be somewhat solubilized. The sodium silicate solution used in such an addition as well as in the subsequent treatment steps is a commercial product widely available with a $SiO_2/Na_2O$ ratio of about 3.25 and a $SiO_2$ content of 28.4 percent. Such a product is convenient but not essential, and other sodium silicate solutions can be used as available. It is desirable, however, that the sodium ion content ($Na^+$) be kept low, since a high sodium ion content tends to cause gelation of silicic acid.

The above-mentioned methods of forming the silica layer on the surface of the lead chromate pigment particles have one feature in common, viz, that the silica is added as "active silica." When sodium silicate is acidified, silicic acid is formed, probably initially as orthosilicic acid, $Si(OH)_4$. However, this product tends to polymerize by the reaction of two silanol groups

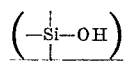

to form a siloxane group

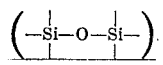

Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples below, there is a low degree of polymerization wherein the condensation between silanol groups has proceeded to only a limited extent leaving the silica in an "active" form which readily deposits on the surface of the lead chromate particles present. It is not intended to imply that there is no polymerization nor that the process of polymerization is completely inhibited but, under the conditions specified, the silica is in a state of low polymerization and, thus "active" for a sufficient time to bring about deposition in the dense, amorphous form on the surface of the lead chromate pigment particles. This term "active silica" has been more precisely defined elsewhere (see Rule U.S. Pat. No. 2,577,484 for instance), but the conditions specified above are adequate for the purposes of this invention.

The quantity of silica to be applied in the pigment treatment can be varied over a considerable range depending on the intended end use of the pigment. For use in extruded hot thermoplastic resins where relatively high temperatures (200°–320°C.) are encountered, higher amounts, from 15 to 32 percent of silica, are desirable. There seems to be no great advantage in exceeding about 32 percent, but amounts up to about 40 percent of the final pigment can be used with some advantage in resistance to the heat treatment, but with some loss in color properties. Amounts less than 15 percent show a noticeable improvement over the untreated product but may lack the desired heat resistance. For other uses, however, such products with lower silica have real value, notably for resistance of coating compositions made therefrom to chemical treatment and to exposure to light. In such applications, as little as 2 percent of dense amorphous silica coatings on lead chromate pigments show real improvements over the untreated counterparts. Thus, for purposes of this invention, in its broadest aspects, the dense amorphous silica coating should be in the range of about 2 to 40 percent by weight of the final pigment. When alumina is also present, a convenient quantity thereof is 0.25 to 2 percent by weight of the final pigment.

The products of the invention are particularly advantageous when used in the formation of paints, printing inks, plastics and other products where outstanding light stability is desired without a sacrifice in thermal stability.

In a preferred embodiment of the invention, an aqueous slurry of the prereduced primrose shade base lead chromate pigment, to which has been added a dilute aqueous solution of sodium silicate, is subjected to intense hydraulic shear, e.g., using a homogenizer, to break up pigment agglomerates. The homogenized slurry is treated as above described, to initiate deposition of a continuous silica coating on the particles of the pigment. Thereafter an aqueous solution of sodium aluminate or aluminum sulfate is added, the pH is adjusted in the latter case to 9.0 to 9.5 and heating is continued, thus altering the composition of the coating so that it thus contains silica and alumina. Alternatively, in perhaps the most practical mode, the initial deposition of the silica coating on the pigment particles can be effected by the addition of dilute sulfuric acid to the suspension of pigment in sodium silicate solution, and this step then followed by the previously mentioned treatment to deposit alumina. In either case, isolation of the product involves filtration, washing, drying and pulverizing, all of which steps are conventional. It is understood, of course, that the steps of drying and grinding may be omitted and the coated pigment product used as an aqueous paste or slurry in subsequent applications.

The following example illustrates this invention in detail. Parts and percentages as used therein are by weight unless otherwise stated.

EXAMPLE 1

The base pigment employed is a prereduced primrose yellow shade lead chromate available from Harshaw Chemical under the designation FR 2100. It is composed of rhombic particles containing 60% $PbCrO_4$ and 30% $PbSO_4$ in solid solution with smaller amounts of other compounds such as basic aluminum silicate and antimony oxide. At the surface of the pigment particles the $CrO_4^{-2}$ ions have been reduced to a lower valence state.

A slurry is prepared of 150 parts of the lead chromate pigment in 1,000 parts of water containing 20 parts of sodium silicate solution (Du Pont's No. 9 grade, containing 28–29% $SiO_2$ by analysis; $SiO_2/Na_2O$ ratio = 3.25). The pH of the slurry is adjusted to 10.6 with 5% NaOH solution and then passed once through a homogenizer (Model SMD 15M–8TA of Manton-Gaulin Manufacturing Company) at 5,000 p.s.i. to break up any pigment agglomerates present in the slurry. The homogenizer is washed with 100 parts of water to remove any residual pigment in the equipment, the washings being added to the original homogenized slurry. The pH of the slurry is readjusted to 11.5 with 5%

NaOH solution, 150 parts water are stirred in and it is then heated to 90°C. The following two solutions are introduced simultaneously with stirring, each at a uniform rate:
1. 115 parts of sodium silicate solution, as described above, diluted to give a volume equivalent to 600 parts of water, and
2. 17.3 parts of 96 percent sulfuric acid diluted with water to give a volume equivalent to 800 parts of water.

Solution 1 is added over 4 hours, solution 2 is added over 5 hours. While maintaining the charge at 90°C. the pH is then adjusted to 9.0 with 5% NaOH solution. There is then added to the slurry a solution of 9 parts of hydrated aluminum sulfate ($Al_2(SO_4)_3 \cdot 18H_2O$) in 36 parts of water and, after stirring for 2 minutes, a solution of 7.5 parts of $Na_2CO_3$ in 30 parts of water. After stirring for 2 more minutes there is added a solution of 11 parts of the same aluminum sulfate in 44 parts of water. Stirring is continued for 2 more minutes and the thus-coated pigment is then isolated in conventional manner by filtration, washing free of sulfate, and drying at 80°C. The dried product is micropulverized prior to testing.

The resulting pigment is characterized by exceptional light stability. In this regard it is markedly superior to another silica encapsulated pigment using a conventional primrose shade base particle which has not been prereduced.

EXAMPLE 2

In this example a primrose yellow shade lead chromate pigment (Part A) is produced by a technique known in the art (per Example 6 of the above-mentioned U.S. Pat. No. 3,370,971) and a portion of it (Part B) is subjected to prereduction using an antimony compound (per U.S. Pat. No. 2,212,917). Each is then silica-coated and tested for lightfastness.

PART A — A solution of 331 parts of lead nitrate ($Pb(NO_3)_2$) in 2,500 parts of water at 26°C. is adjusted to pH 4.0–4.3 after which a solution of 50 parts of sodium carbonate in 400 parts of water is added over a period of 1 minute. In a separate container 112 parts of sodium dichromate ($Na_2Cr_2O_7 \cdot 2H_2O$), 13.8 parts of $H_2SO_4$ (98 percent), 6.2 parts of sodium sulfate ($Na_2SO_4$) and 10 parts of aluminum sulfate ($Al_2(SO_4)_3 \cdot 18H_2O$) are dissolved in 2,500 parts of water at 26°C. and the pH adjusted to 1.8–1.9. This solution is then added in 1 minute to the slurry of lead carbonate and stirred for 5 minutes, the pH being about 4.0–4.3. Then there is added rapidly a solution of 1.7 parts sodium pyrophosphate ($Na_4P_2O_7$) in 40 parts of water, a solution of 4.2 parts sodium carbonate in 16.8 parts of water and 29.6 parts sodium silicate (about 28.4% $SiO_2$, ratio of $SiO_2/Na_2O$ is about 3.28). A pH of about 6.0–6.2 is recorded.

There is then added at 2 minute intervals, while stirring, a solution of 29 parts aluminum sulfate ($Al_2(SO_4)_3 \cdot 18H_2O$) in 116 parts of water, 6 parts sodium carbonate in 24 parts water and 1.6 parts sodium pyrophosphate in 50 parts of water and the pH adjusted with sodium carbonate to a final value of 5.2–5.5. Thereupon the material is filtered, washed until free of soluble salts, dried 16 hours at 93°C., baked 2 hours at 130°C., and pulverized.

PART B — The procedure is identical through the first paragraph of Part A. At this point the pH is adjusted to 8.4–8.6 with 5% NaOH solution and there is added with a 2 minute stir 3 parts antimony oxide dissolved in 14.65 parts 37.5 percent hydrochloric acid, 29 parts aluminum sulfate ($Al_2(SO_4)_3 \cdot 18H_2O$) in 116 parts of water, and the pH is adjusted to 5.2–5.5 with sodium carbonate. The steps of filtering, washing, and recovery set forth in the second paragraph of Part A are then followed.

The following procedure is then carried out for preparation of the corresponding silica-coated pigments:

A slurry is prepared of 150 parts of the lead chromate pigment in 1,000 parts of water containing 20 parts of sodium silicate solution (Du Pont's No. 9 grade, containing 28–29% $SiO_2$ by analysis; $SiO_2/Na_2O$ ratio = 3.25). The slurry is premixed for 3 minutes and then passed once through a homogenizer as in Example 1 to break up pigment agglomerates. The homogenizer is washed with 200 parts of water to remove any residual pigment in the equipment, the washings being added to the original homogenized slurry. The pH of the slurry (10.15 for Part A, 10.2 for Part B) is adjusted to 11.5 with 5% NaOH solution, and it is then heated to 90°C. and held at that temperature throughout. The following two solutions are introduced simultaneously with stirring, each at a uniform rate:
1. 115 parts of sodium silicate solution, as above, diluted to give a volume equivalent to 600 parts of water, and
2. 17 parts of 98 percent sulfuric acid diluted with water to give a volume equivalent to 800 parts of water.

Solution 1 is added over 4 hours, solution 2 is added over 5 hours. While maintaining the charge at 90°C. the pH is then adjusted to 9.0 with 5% NaOH solution. There is then added to the slurry at 1 minute intervals a solution of 9 parts of aluminum sulfate ($Al_2(SO_4)_3 \cdot 18H_2O$) in 36 parts of water, a solution of 7.5 parts of $Na_2CO_3$ in 30 parts of water and a solution of 11 parts of the same aluminum sulfate in 44 parts of water. The thus-coated pigment is then isolated in conventional manner by filtration, washing free of sulfate, and drying at 93°C. The dried product is pulverized prior to testing.

The resulting pigment is tested on a qualitative basis for lightfastness by dispersing in lithographic varnish (see ASTM Test for Mass Color and Tinting Strength — D 387-60). Masstone panels are exposed to light by a carbon arc for 24 hours. The pigment of Part B is rated very much better than the pigment of Part A. The thermal stability of the two materials is rated as equivalent (using the test procedure given in Example 1 of U.S. Pat. No. 3,639,133 wherein the pigment is dispersed in polystyrene, the composition injection molded and examined for darkening).

What is claimed is:
1. A lead chromate pigment encapsulated with a coating of 2 to 40 weight percent of dense amorphous silica and characterized by outstanding light stability, the base thereof being composed of a primrose yellow shade of an orthorhombic phase lead chromate-lead sulfate solid solution containing 20–50 weight percent of lead sulfate, the surface of the base particles having been prereduced chemically prior to application of said coating to convert the chromate of said solid solution to a lower valence state.

* * * * *